United States Patent
Buxbaum

(10) Patent No.: US 6,576,350 B2
(45) Date of Patent: Jun. 10, 2003

(54) HYDROGEN PERMEABLE MEMBRANE AND HYDRIDE BATTERY COMPOSITION

(76) Inventor: Robert E. Buxbaum, 254541 Gardner Pl., Oak Park, MI (US) 48237

( * ) Notice: Subject to any disclaimer, the term of this patent is extended or adjusted under 35 U.S.C. 154(b) by 0 days.

(21) Appl. No.: 10/145,273

(22) Filed: May 14, 2002

(65) Prior Publication Data

US 2002/0127426 A1 Sep. 12, 2002

Related U.S. Application Data

(62) Division of application No. 09/436,675, filed on Nov. 9, 1999, now Pat. No. 6,395,405.
(60) Provisional application No. 60/107,627, filed on Nov. 9, 1998.

(51) Int. Cl.[7] ............................ B32B 15/00; H01M 4/00
(52) U.S. Cl. ...................... 428/670; 428/469; 428/655; 428/689; 429/218.2
(58) Field of Search ................. 428/670, 570, 428/655, 689, 469; 420/416, 900; 429/218.2

(56) References Cited

U.S. PATENT DOCUMENTS

| | | | |
|---|---|---|---|
| 3,351,049 A | 11/1967 | Lawrence | 600/8 |
| 4,323,055 A | 4/1982 | Kubiatowicz | 424/1.11 |
| 4,702,228 A | 10/1987 | Russell, Jr. et al. | 600/8 |
| 4,784,116 A | 11/1988 | Russell, Jr. et al. | 600/8 |
| 4,859,413 A * | 8/1989 | Harris et al. | 420/590 |
| 4,994,013 A | 2/1991 | Suthanthiran et al. | 600/8 |
| 5,085,944 A * | 2/1992 | Ebato et al. | 428/570 |
| 5,217,506 A | 6/1993 | Edlund et al. | 95/56 |
| 5,342,283 A | 8/1994 | Good | 600/8 |
| 5,393,616 A | 2/1995 | Mori et al. | 429/59 |
| 5,395,300 A | 3/1995 | Liprie | 600/3 |
| 5,405,309 A | 4/1995 | Carden, Jr. | 600/3 |
| 5,738,708 A | 4/1998 | Peachey et al. | 95/56 |
| 5,738,953 A | 4/1998 | Lichtenberg et al. | 429/59 |
| 5,738,958 A | 4/1998 | Lichtenberg | 429/223 |
| 5,766,676 A | 6/1998 | Park et al. | 427/123 |
| 5,783,334 A | 7/1998 | Yasuda | 429/223 |
| 5,798,033 A | 8/1998 | Uemiya et al. | 205/161 |
| 5,845,732 A | 12/1998 | Hasebe et al. | 429/101 |
| 5,849,430 A | 12/1998 | Lee | 429/94 |
| 5,856,047 A | 1/1999 | Venkatesan et al. | 429/245 |
| 5,888,665 A | 3/1999 | Bugga et al. | 420/900 |
| 5,888,669 A | 3/1999 | Thompson, Jr. et al. | 429/231.95 |

FOREIGN PATENT DOCUMENTS

| | | | | |
|---|---|---|---|---|
| EP | 0251384 | 1/1988 | | |
| EP | 0591606 | 4/1994 | | |
| EP | 0671357 | 9/1995 | | |
| WO | WO 98/50968 A1 * | 11/1988 | | H01M/4/38 |
| WO | WO 9623906 | 8/1996 | | |

* cited by examiner

*Primary Examiner*—Robert R. Koehler
(74) *Attorney, Agent, or Firm*—Gifford, Krass, Groh, Sprinkle, Anderson & Citkowski, P.C.

(57) ABSTRACT

A hydride battery electrode is coated with palladium or a palladium alloy to improve hydride storage properties and recycle characteristics. A hydrogen purification membrane including a metallic substrate likewise has improved properties upon coating with palladium and a surface species of an alkali metal, alkaline earth element or alkaline earth cation. Novel metal hydrogen purification membranes include vanadium alloyed with at least 1 to 20 atomic percent nickel and/or 1 to 20 atomic percent cobalt and/or 1 to 20 atomic percent palladium.

7 Claims, 3 Drawing Sheets

FIG - 3a (uncoated) $Mm_{0.95}Ti_{0.05}Ni_{0.85}Co_{0.45}Mn_{0.36}Al_{0.35}$
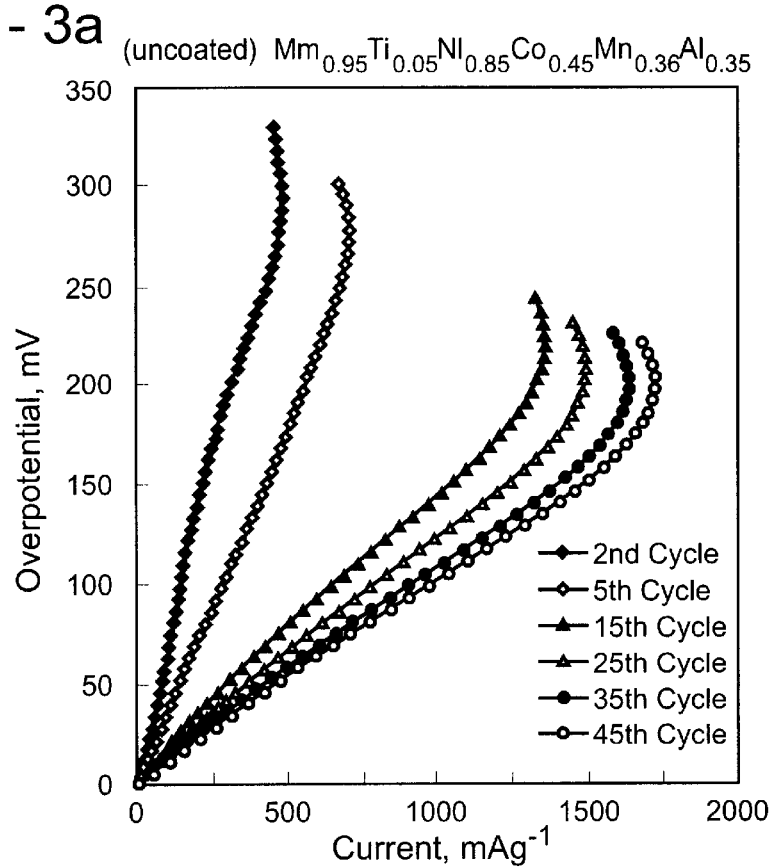
FIG - 3b (Pd-coated) $Mm_{0.95}Ti_{0.05}Ni_{0.85}Co_{0.45}Mn_{0.36}Al_{0.35}$
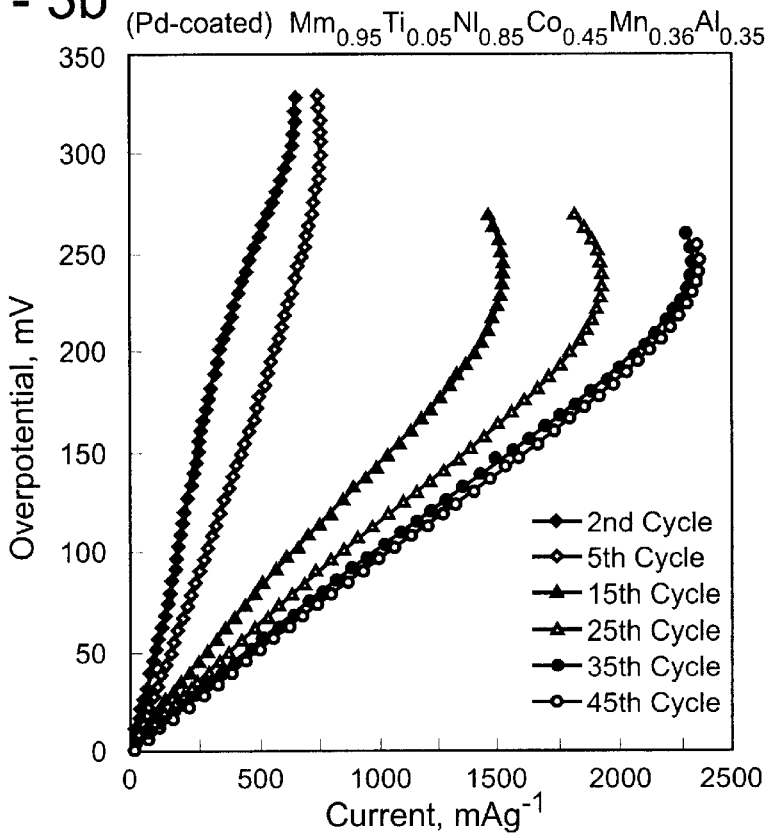

HYDROGEN PERMEABLE MEMBRANE AND HYDRIDE BATTERY COMPOSITION

RELATED APPLICATIONS

This application is a divisional of U.S. patent application Ser. No. 09/436,675 filed Nov. 9, 1999, now U.S. Pat. No. 6,395,405, which claims priority of U.S. Provisional Patent Application No. 60/107,627 filed Nov. 9, 1998.

FIELD OF THE INVENTION

The present invention relates to separation and purification of hydrogen gas from a fluid mixture and, more particularly, to a membrane composition operative as a hydride battery component.

BACKGROUND OF THE INVENTION

A common technology for extracting high purity hydrogen from industrial gas streams involves selectively diffusing hydrogen through a membrane. High purity hydrogen is used extensively in semiconductor manufacture, fuel cell operation and hydrogenation reactions. Membranes capable of selectively passing hydrogen therethrough have utilized palladium or palladium alloys alone, or supported structurally by a matrix. A suitable hydrogen purification membrane requires a thick enough palladium layer to be made which is free of holes and structurally sound over a working lifetime of at least several months. A palladium-silver membrane is typical of those currently in use. Palladium-silver membranes are limited in their utility due to material costs and limited throughput associated with relatively high resistance to hydrogen permeation. Alternative membrane materials which have been considered as substitutes for palladium-silver have included palladium coated vanadium, niobium, tantalum, and vanadium-nickel. The palladium coat on such membranes functions to increase hydrogen permeation at temperatures below 700° C. and further, to protect the underlying substrate of vanadium, niobium, tantalum or vanadium-nickel from corrosion associated with impurities in the input gas stream. A limitation associated with palladium coated alloys currently under development to supplant palladium-silver is embrittlement upon contact with hydrogen at room temperature. Membrane embrittlement occurs when a membrane unit is rapidly cooled from operating temperature to room temperature. Rapid cooling is associated with power disruption, membrane unit failure, an emergency override situation and the like. Thus, there exists a need to find hydrogen permeable alloys that are more embrittlement resistant than palladium coated vanadium, niobium, tantalum or vanadium-nickel.

A number of technologies benefit from coating palladium onto surfaces in addition to hydrogen separation. In particular, hydride battery electrodes and bracheotherapy are improved by the present invention.

SUMMARY OF THE INVENTION

A hydride battery electrode is coated with palladium or a palladium alloy to improve hydride storage properties and recycle characteristics.

A hydrogen purification membrane including a metallic substrate likewise has improved properties upon coating with palladium and a surface species of an alkali metal, alkaline earth element or alkaline earth cation.

Novel metal hydrogen purification membranes include vanadium alloyed with at least 1 to 20 atomic percent nickel and/or 1 to 20 atomic percent cobalt and/or 1 to 20 atomic percent palladium.

BRIEF DESCRIPTION OF THE DRAWINGS

Other advantages of the present invention will be readily appreciated by reference to the following detailed description when considered in connection with the accompanying drawings wherein:

FIGS. 3a and 3b are graphs showing the over potential as a function of current for the uncoated electrode (3a) and the palladium coated electrode (3b)

DETAILED DESCRIPTION OF THE INVENTION

Figure 1:
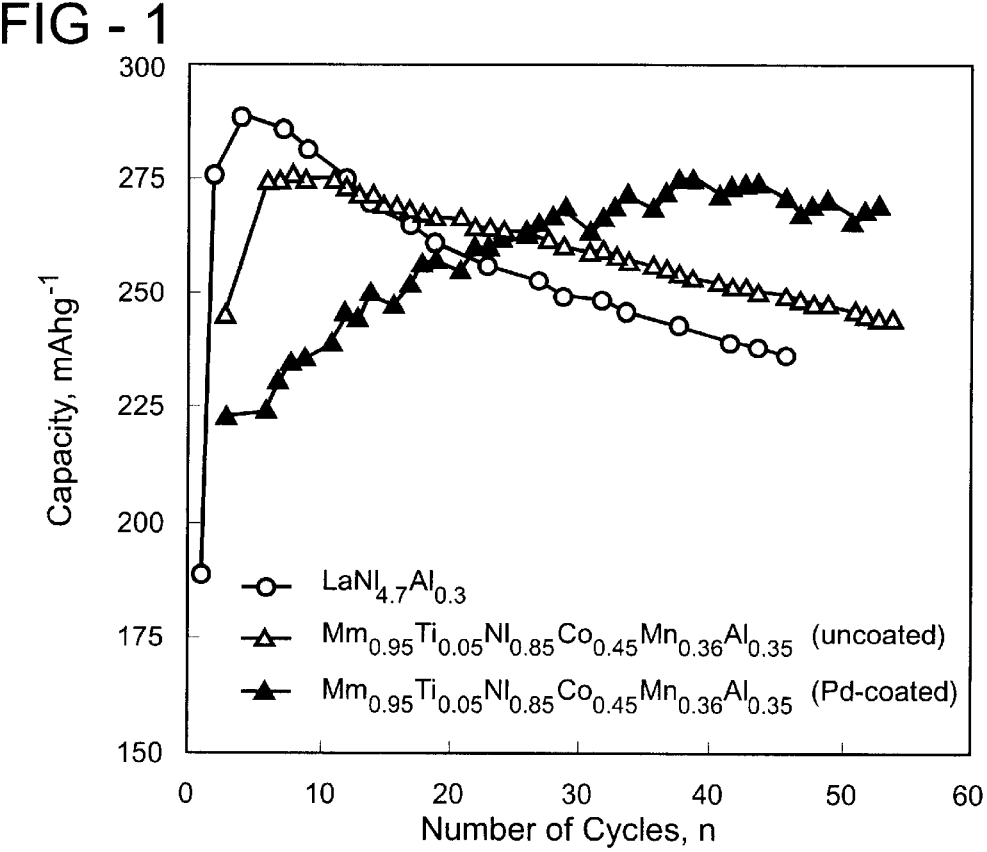
FIG. 1 is a graph showing the current capacity of a hydride battery electrode uncoated and with a palladium coating according to the present invention, as a function of recharge cycles where Mm denotes misch metal which is at least a binary composition including at least two lanthanide series elements.
Figure 2:
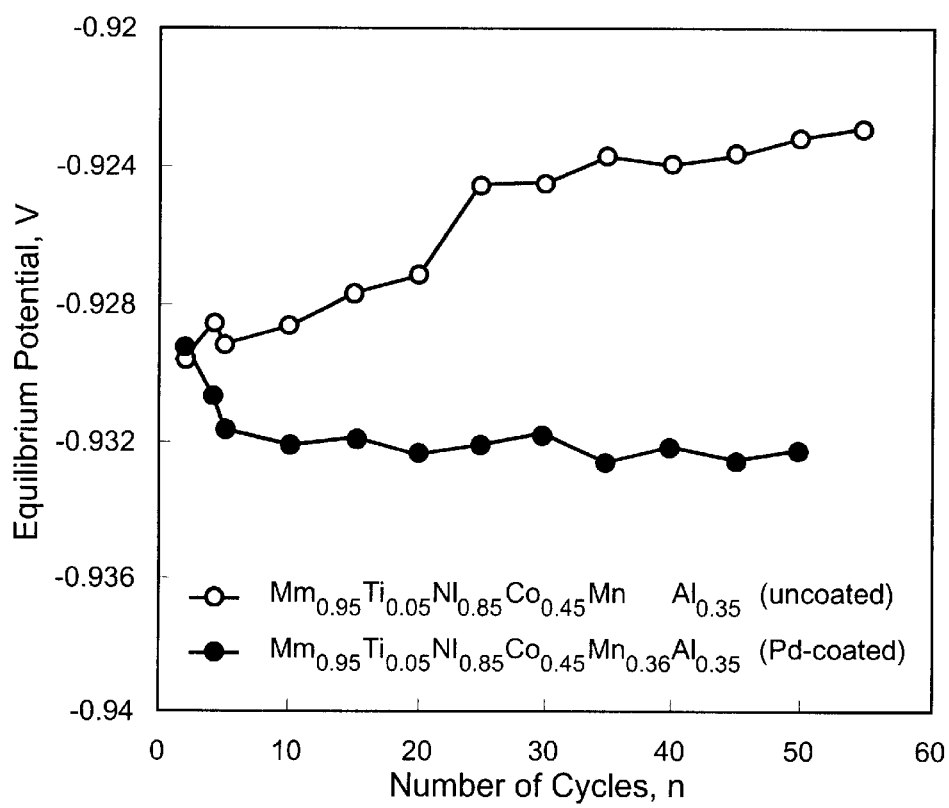
FIG. 2 is a graph showing the equilibrium potential for an uncoated and palladium coated hydride battery electrode material according to the present invention as a function of recharge cycles.
Figure 4:
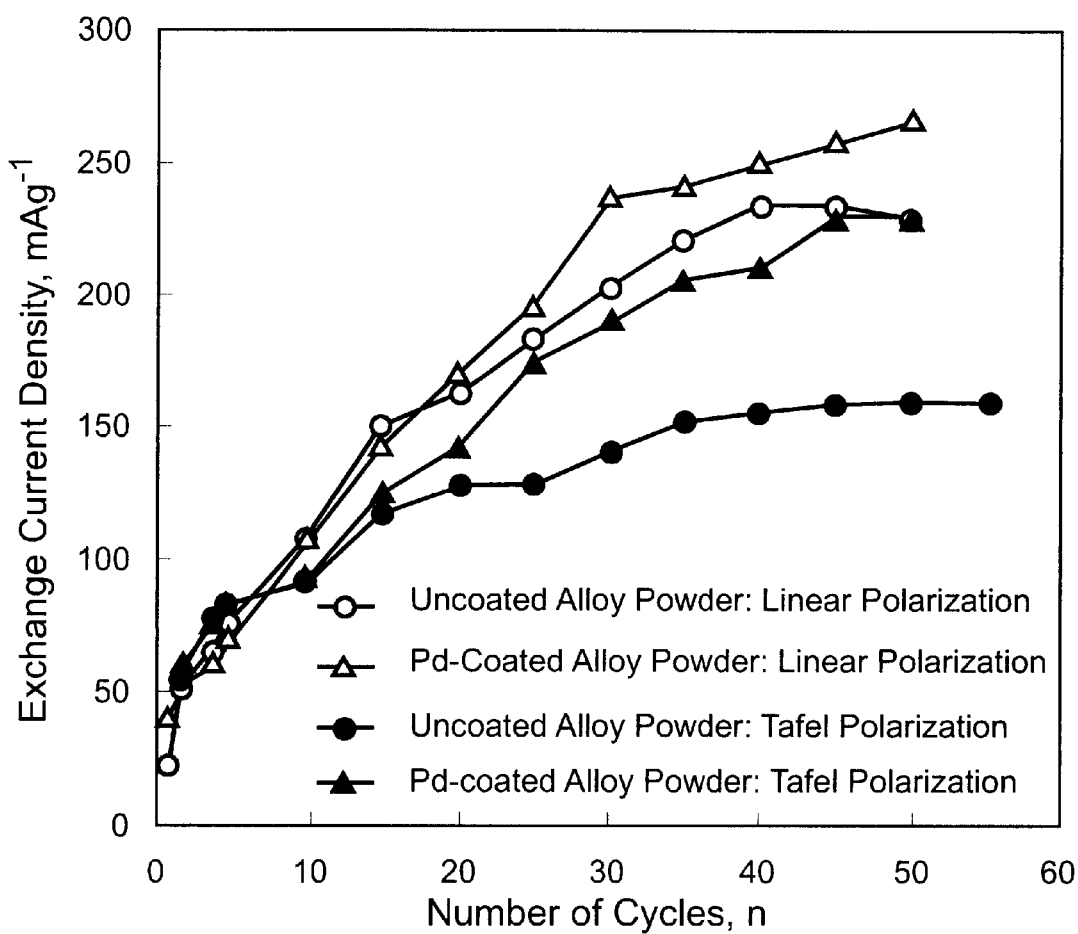
FIG. 4 is a graph showing exchange current density as a function of recharge cycles for the materials sampled in FIGS. 3a and b under linear and tafel polarization conditions.

The present invention also has utility in improving the cycle performance of hydride battery electrodes. As shown in FIG. 1, $LaNi_{4.7}Al_{0.3}$ shows an exponential capacity decay over approximately 50 cycles as a hydride battery electrode. A more linear decay in performance is observed for the intermetallic alloy $Mm_{0.95}Ti_{0.05}Ni_{0.85}Co_{0.45}Mn_{0.36}Al_{0.35}$, where Mm includes any two lanthanide series elements. Nonetheless, $Mm_{0.95}Ti_{0.05}Ni_{0.85}Co_{0.45}Mn_{0.36}Al_{0.35}$ does not attain a stable capacity suitable for a rechargeable hydride battery electrode. According to the present invention, coating $Mm_{0.95}Ti_{0.05}Ni_{0.85}Co_{0.45}Mn_{0.36}Al_{0.35}$ with a palladium coating improves electrode performance as compared to uncoated electrode material, as shown in FIGS. 1–4. The electrode is coated with palladium or a palladium alloy, the palladium alloy illustratively forming an intermetallic with main group elements atomic numbers 21–30, 39–45, silver, the lanthanide series, atomic numbers 72–79, boron, and aluminum. Preferably, a palladium or palladium alloy coating according to the present invention is continuous. More preferably, a palladium or palladium alloy coating has a thickness greater than 50 nanometers.

According to the present invention, the following alloys demonstrate superior embrittlement resistance as compared to prior art substrate materials. Embrittlement resistant alloys of the present invention are characterized by having a bulk vanadium phase which is alloyed with one or more of the following lesser components: nickel to between 1 and 20 atomic percent nickel, 1 to 20 percent cobalt, and 1 to 20 percent palladium. Preferably, alloys of the present invention contain more than 3 and less than 30 total atomic percent of the lesser components: nickel, cobalt and palladium. More preferably, total lesser components account for more than 3 and less than 15 atomic percent. Alloys particularly well suited for application as hydrogen purification membranes illustratively include vanadium-5 atomic percent nickel-5 atomic percent cobalt and vanadium-10 atomic percent palladium. The alloys of the present invention are operative as purification membranes upon forming into a membrane or alternatively at least one side of the alloy membrane is optionally palladium coated.

A hydrogen permeable membrane according to the present invention containing palladium as an alloy constituent or having a palladium coating has superior hydrogen separation efficiency as compared to prior art membranes through the addition of a quantity of alkali metal or alkaline earth elements as surface deposits thereon. It is appreciated that an alkali metal is deposited on a membrane surface as alkali metal salt. Alkali metal salts illustratively include fluorides, chlorides, bromides and iodides, oxides, sulfides, selenides, nitrides, phosphides, carbonates, nitrates, sulfates, chlorates, chlorites, perchlorates, sulfates, carboxylates, sulfonates, aluminates, borates, chromates, cyanamides, cyanates, cyanides, and the like. An alkaline earth element is applied in the membrane surface either as salts or as zero oxidation state metals. The salts of alkali earth elements operative in the present invention illustratively include: fluorides, chlorides, bromides and iodides, oxides, sulfides, selenides, nitrides, phosphides, carbonates, nitrates, sulfates, chlorates, chlorites, perchlorates, sulfates, carboxylates, sulfonates, aluminates, borates, chromates, cyanamides, cyanates, cyanides, and the like. An alkali earth metal is readily applied to a membrane through conventional methods including evaporative or electrochemical reduction of an alkali earth salt. Of the alkaline earth elements strontium is particularly effective when applied either as a metal or as strontium chloride.

Electroless deposition of palladium-103 according to the present invention also has utility in bracheotherapy and overcomes limitations associated with prior art electrodeposition as detailed in, for example, U.S. Pat. No. 5,405,309. In this form of bracheotherapy, the radioactive Pd is electrodeposited on a carbon pellet and the Pd-coated pellet is then sealed into a titanium capsule along with an ultrasonic sensitive marker. The marker facilitates proper insertion of the capsule shell within the patient using an ultrasound signal. Typically, several such capsules or "seeds" are inserted into a tumor. Once in the tumor, the seeds irradiate the site locally with a half life of about 17 days, and thereafter may remain in the patient indefinitely. Since the radiation flux decreases dramatically with distance from the seed, there are fewer side effects associated with this method, as compared to external beam irradiation. In a modified form of seed bracheotherapy, the irradiation from the seeds is supplemented by external beam irradiation. For this modified form, it is important that the seeds should not shield the tumor excessively from the irradiating external beam.

In one embodiment of the instant invention a palladium salt is dissolved in an aqueous or alcoholic solution buffered to a suitable pH for redox chemistry in which the reducing agent acting on the palladium (II) ion is hydrazine. The solution is buffered, for example, through the presence of disodium ethylene diaminetetra acetic acid (EDTA) and soluble alkali metal or alkaline earth chloride salts. Palladium salts operative in electroless deposition of the instant invention illustratively include palladium chloride, palladium chloride dihydrate, palladium nitrate, palladium selenate, palladium sulfate, palladium monoxide hydrate, diamine palladium (II) hydroxide, dichlorodiamine palladium (II), tetramine palladium (II) chloride and tetramine palladium. Tetrachloro palladate (Vauquelin's salt), a buffered solution containing a soluble palladium salt upon the addition of hydrazine, begins to plate out palladium metal at a rate increasing with temperature over the solution temperature range from 0 to 100° C. Preferably, the solution temperature during redox chemistry is between 10 and 50° C. Since formation of palladium metal atoms from the ions occurs uniformly throughout a well-mixed solution, uniform coatings of palladium metal result. The pellet substrates operative in the instant invention include a variety of polymeric materials illustratively including cellulose, cellubiose, polyethylene, polycarbonate, polyvinylchloride, polyurethane, DACRON, nylons, TEFLON and the like; graphitic carbon; silicates; aluminates; boron; beryllium; magnesium; and aluminum. For the purposes of this invention a substrate is defined as a material suitable for the deposition adherence of metallic palladium thereto, the shape of the substrate is includes spheroids, ribbons and films. The substrate is the instant invention must also be suitable for encapsulation within a biocompatible shell. It is preferred that in order to build up a thickness of palladium metal and minimize self-shielding of palladium-103 decay by other palladium isotopes, that a layer of nonradioactive palladium be coated onto the pellet substrate, the nonradioactive palladium underlayer serving as a substrate for a second coating, the second coating utilizing $^{103}$Pd containing salts as a reagent. More preferably the pellet substrate is a polymeric material owing in part to the low mass density, low average atomic number and low radiation absorption cross-section, as compared to graphitic carbon and other inorganic materials. The instant invention provides efficient delivery of radiation to the surrounding tissue upon implantation in instances where $^{103}$Pd coated pellets are used alone (bracheotherapy) or when used in combination with external radiation sources. In addition, the polymeric substrates taught herein are flexible and readily formed into a variety of shapes and as a result $^{103}$Pd coated wires, films and otherwise deformable three-dimensional structures are formed which find application in surgical treatment of cancerous tissue as sutures and implantable materials.

In another embodiment of the instant invention a palladium coating is plated onto a substrate by an immersion deposition process. Immersion deposition in the instant invention utilizes the high reductive electrochemical potential of palladium to displace a reduced substance in contact with the palladium ions. Preferably, the displaced material is a flexible metallic element that is stable in mild acid solutions. Such metals include copper, nickel or iron. Under suitable solution conditions palladium ions displace metallic copper without the need for an additional reducing agent. As an example of immersion deposition of palladium, suitable solution conditions for palladium immersion deposition typically include $PdCl_2$ or Vauquelin's salt in aqueous solution of pH between 0.1 and 5 in which a low pH is obtained with a mineral acid whose anion is capable of stabilizing copper, nickel or iron ions in solution. Such acids illustratively include hydrochloric and sulfuric.

While electroless deposition is well suited for depositing a nonradioactive palladium layer, especially on a polymeric substrate, an immersion deposition is preferred for the plating of palladium that is enriched with palladium-103 in amounts suitable for bracheotherapy. Immersion deposition as is completed to electroless deposition is less sensitive to palladium-103 decay to rhodium-103, which accumulates in solution as plating progresses, and thereby degrading to solution.

The following examples are illustrative of the present invention and not intended to be a limitation on the scope of the invention, which is defined by the appended claims.

EXAMPLE 1

A 0.010 inch diameter clean V-7% Ni-7% Pd tubular membrane is inserted into a solution containing $PdCl_2$ dissolved in HCl having a pH of 1.5 and a palladium ion concentration of 1 gram per gallon. A uniform coating of palladium is deposited on the membrane in a matter of minutes at room temperature. The reaction is observed to slow as the copper surface is progressively coated.

EXAMPLE 2

The process of Example 1 is repeated using Vauquelin's salt in place of palladium chloride. The solution pH is 3.5 prior to the insertion of the membrane wire. The plating is carried out at 50° C. A uniform coating of palladium is deposited on the membrane in a matter of minutes. The plating reaction is observed to slow as the membrane surface is progressively coated.

EXAMPLE 3

A 0.5 cm diameter rod of $Mm_{0.95}Ti_{0.05}Ni_{0.85}Co_{0.45}Mn_{0.36}Al_{0.35}$ is coated with 0.5 microns of palladium as recited in Example 1. The resulting palladium coated rod is encapsulated in a solid electrolyte by conventional methods and serves as a hydride electrode.

EXAMPLE 4

The procedure of Example 3 is repeated with a $LaNi_{4.7}Al_{0.3}$ rod. Electrode capacity stabilized over 50 charging cycles as compared to the uncoated rod.

EXAMPLE 5

The procedure of Example 3 is repeated with a $LaNi_5$ rod. Electrode capacity stabilized over 50 charging cycles as compared to the uncoated rod.

EXAMPLE 6

A coil of 0.010 inch diameter clean copper wire is inserted into a solution containing $PdCl_2$ dissolved in HCl having a pH of 1.5 and a palladium ion concentration of 1 gram per gallon. A uniform coating of palladium is deposited on the copper in a matter of minutes at room temperature. The reaction is observed to slow as the copper surface is progressively coated.

EXAMPLE 7

The process of Example 1 is repeated using Vauquelin's salt in place of palladium chloride. The solution pH is 3.5 prior to the insertion of the copper wire. The plating is carried out at 50° C. A uniform coating of palladium is deposited on the copper in a matter of minutes. The plating reaction is observed to slow as the copper surface is progressively coated.

EXAMPLE 8

Graphitic carbon pellets are coated with 1–3 microns of nonradioactive copper by conventional electroless deposition techniques with formaldehyde serving as the reducing agent. The copper coated carbon pellets are then washed with deionized water and placed in a solution containing radioactive palladium-103, as recited in Example 1. The resulting radioactive palladium coated pellet is encapsulated in titanium by conventional methods and serves as a bracheotherapy seed.

EXAMPLE 9

A cellulose based size exclusion separation membrane film approximately 5 mils in thickness is coated first with copper and then with radioactive palladium, as recited in Example 3. The resulting radioactive metallized polymer film is heat sealed in surgical grade TEFLON and is functional as a radioactive suture patch.

Various modifications of the instant invention in addition to those shown and described herein will be apparent to those skilled n the art from the foregoing description. Such modifications are also intended to fall within the scope of the appended claims.

What is claimed is:
1. A hydride battery electrode comprising:
    an intermetallic core of $LaNi_{4.7}Al_{0.3}$; and
    a coating on said core having a surface, said coating selected from a group consisting of: palladium and palladium alloys.
2. The hydride battery electrode of claim 1 wherein said coating has a thickness greater than 50 nanometers.
3. The hydride battery electrode of claim 1 further comprising an alkali metal salt deposited on the surface.
4. A hydride battery electrode comprising:
    an intermetallic core of $Mm_{0.95}Ti_{0.05}Ni_{0.85}Co_{0.46}Mn_{0.36}Al_{0.35}$; and
    a coating on said core having a surface, said core selected from a group consisting of: palladium and palladium alloys.
5. The hydride battery electrode of claim 4 wherein said coating has a thickness greater than 50 nanometers.
6. The hydride battery electrode of claim 4 wherein said coating further comprises an alkali metal salt deposited on a surface.
7. A hydride battery electrode consisting essentially of:
    an intermetallic core selected from a group consisting of $LaNi_{4.7}Al_{0.3}$ and $Mm_{0.95}Ti_{0.05}Ni_{0.85}Co_{0.46}Mn_{0.36}Al_{0.35}$; and
    a coating on said core selected from a group consisting of: palladium and palladium alloys.

\* \* \* \* \*